Nov. 3, 1964    S. A. GARSON ETAL    3,155,419
CONVERTIBLE TRAILER
Filed Jan. 3, 1961    3 Sheets-Sheet 1

INVENTORS
Stanley A. Garson &
Carlowen Smith

BY *Fidelman & Lavine*
ATTORNEY

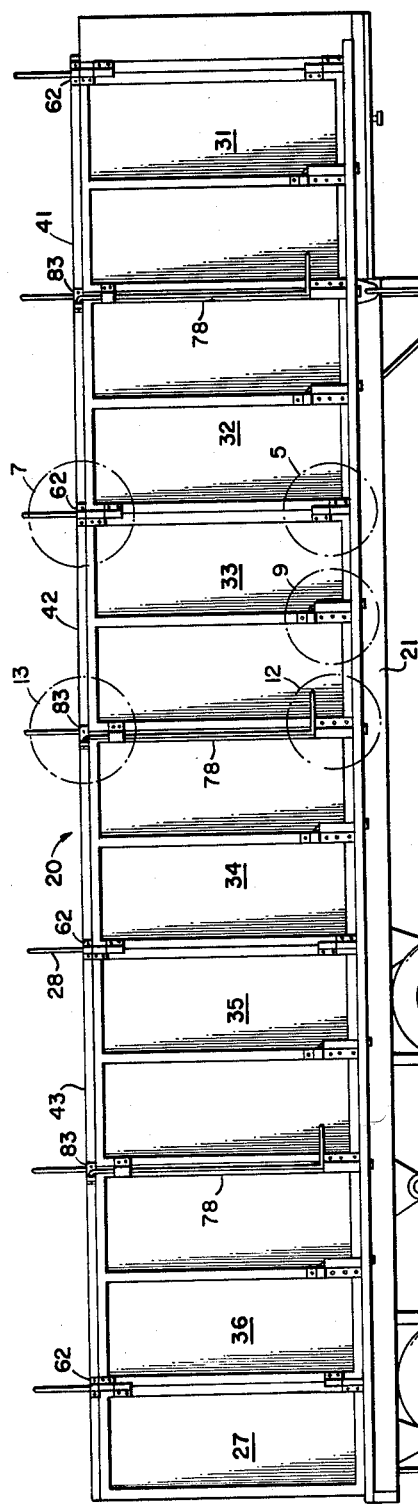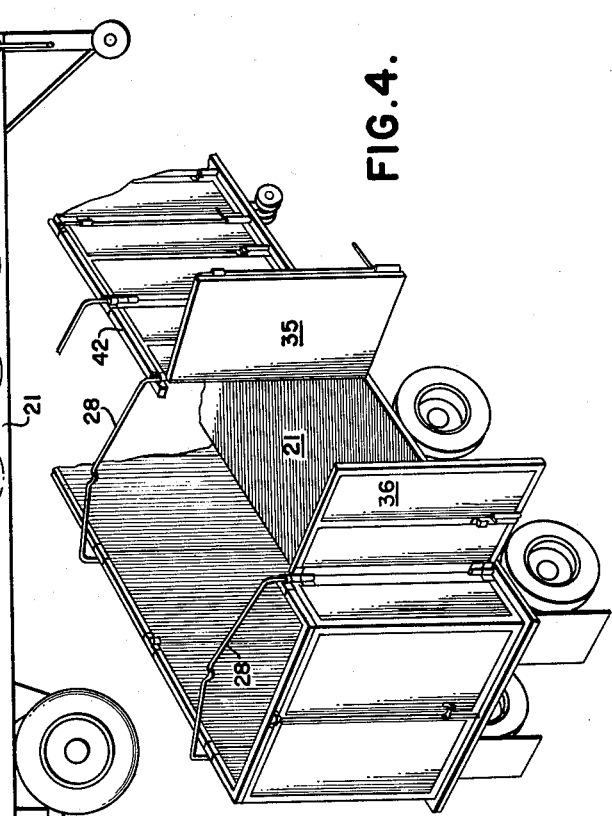

Nov. 3, 1964    S. A. GARSON ETAL    3,155,419
CONVERTIBLE TRAILER
Filed Jan. 3, 1961    3 Sheets-Sheet 3
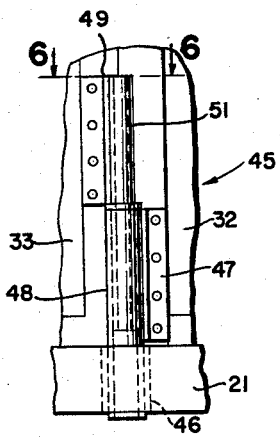
FIG.5.
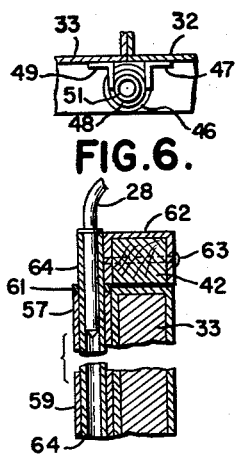
FIG.6.
FIG.8.
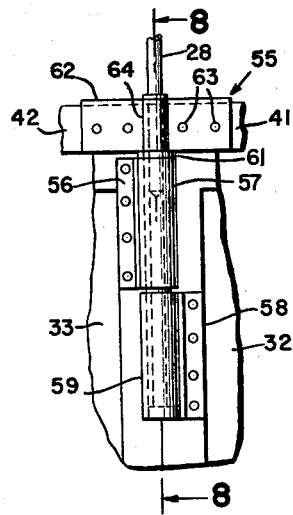
FIG.7.
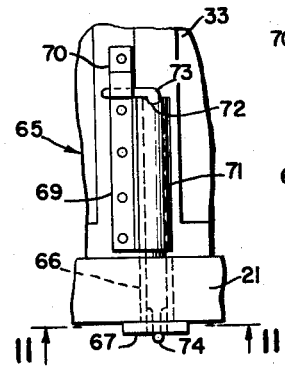
FIG.9.    FIG.10.
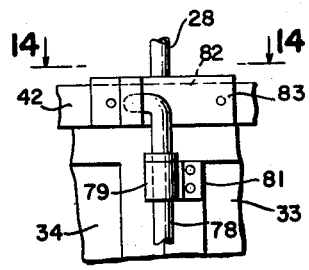
FIG.13.
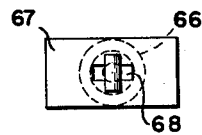
FIG.11.
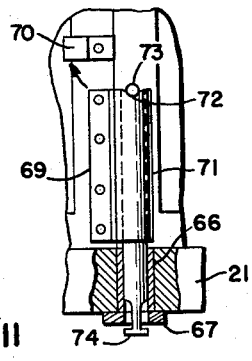
FIG.14.
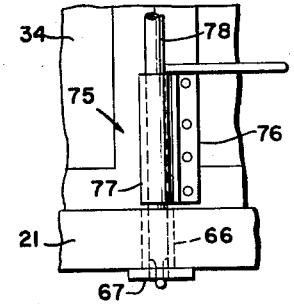
FIG.12.
INVENTOR
Sanley A. Garson &
Carlowen Smith
BY *Fidelman & Lavine*
ATTORNEY United States Patent Office 3,155,419
Patented Nov. 3, 1964

3,155,419
CONVERTIBLE TRAILER
Stanley A. Garson, 623 Bush Hill Road, Irwin, Pa., and Carlowen Smith, Uniontown, Pa.; said Smith assignor to said Garson
Filed Jan. 3, 1961, Ser. No. 80,329
16 Claims. (Cl. 296—28)

The present invention relates to convertible trailers, and more particularly to trailers or similar vehicle bodies having plural pairs of contiguous door panels constituting at least part of the linear extent of the sides of the bodies and substantially the full height thereof which door panels may be opened to provide large areas for side loading, and which door panels are readily removable. The present invention also relates to certain component parts and subassemblies, such as hardware items, which are embodied in the body construction.

The two basic categories of trailers, other than special use vehicles, are permanent van construction, which may be either open or closed top van, and flatbed construction which may optionally be provided with removable side racks.

Typically, van type trailers have doors at the rear end and relatively small side doors, usually only one set or pair in a side. The opening provided by the door is less than the full height of the body side. These van type trailers are usually loaded through their rear doors, and this requires the loaders or mobile load carriers to enter the van, and thus there is an inherent restriction on the type of goods which can be readily loaded onto these trailers. The side doors tend to overcome this problem, but do not completely solve it, since they are of limited height, and permit side loading only at the place where they are located along the side of the trailer. Further, it is not possible to load van type trailers using an overhead crane with depending cable and load engaging means, since, even with an open top van, there is a header or panel which extends over the door opening.

With the flatbed rack type trailer, there is experienced great difficulty and unhandiness in removing the rack. This operation usually requires two men to work simultaneously to jack the rack out of pockets in the side of the trailer bed. With the racks removed, the trailer could be side loaded and the trip made with either the racks restored into position or made without the racks on the sides of the trailer bed.

In the loading of a flatbed trailer with side racks, it has been the practice to entirely remove the racks and place them on the ground or wherever convenient. This has resulted, in addition to the damaging of the racks when they get stuck in order to remove them, in the distortion or warping of the racks so that they become more and more difficult to handle.

Several approaches have been made to the problem of side loading van type bodies along substantially the entire length of the side. One of these involves the utilization of sliding doors, but has been found to be objectionable because a header was required and because the multiple tracks for the doors decreased the available floor area. Also, such constructions were not convertible to flatbed type trailers or bodies, thus not providing for flexibility of use.

Another attempt at a solution to the problem was a body construction in which a single pair of door panels constituted the entire body side construction, there being provided on one side a pair of end posts and an intermediate post which were placed in sockets in the frame or floor. The side panels were pivotally connected to these posts, and thus the construction was not sufficiently strong or sufficiently rigid for extended use, i.e., the posts would soon work loose in their sockets and the upper part of these panels were subject to "weaving," a term used to indicate the movement of the panel upper edges out of their normal position, both inboard and outboard. Due to this characteristic structural insufficiency, this previous construction was inherently limited to a single pair of panels only, and thus was usable only where the body was to be relatively short, approximately twelve feet. The construction could not, therefore, be utilized with substantially longer bodies, since increasing the length of the side panels would make them unwieldy and either weak as units or unduly heavy, and since duplication of the side panels would result in amplification of the weakness of the side and its proneness to weaving.

An object of the present invention is to provide a trailer or like body construction which is readily convertible between van type and flatbed type.

Another object of the present invention is the provision of a van type body of relatively great length which may be side loaded along substantially the entire side thereof.

Yet another object of the present invention is to provide such a body construction in which plural sets of contiguous door panels constitute substantially the entire height of the body side.

A further object of the present invention is the provision of a body construction which may be side loaded along substantially the entire body side by an overhead crane or the like with depending cable and load engaging means.

A still further object of the present invention is the provision of a trailer or like body construction which will accomplish one or more of the above stated objects and which will be strong throughout, and also will not be prone to objectionable weaving, i.e., racking.

Other objects of the present invention are to provide subassemblies and hardware which will readily and economically facilitate the attainment of the above stated and related objects.

Still other objects will become apparent from the following specification and drawings, wherein:

FIG. 3 is an elevational view of the trailer of FIG. 1.

FIG. 4 is a partial perspective view, similar to FIG. 1, but showing a pair of door panels in a partially opened position.

FIG. 5 is an enlarged view of the encircled area designated 5 on FIG. 3.

FIG. 6 is a cross-sectional view taken on the line 6—6 of FIG. 5.

FIG. 7 is an enlarged view of the encircled area designated 7 on FIG. 3.

FIG. 8 is a cross-sectional view taken on the line 8—8 of FIG. 7, with parts removed.

FIG. 9 is an enlarged view of the encircled area designated 9 on FIG. 3.

FIG. 10 is a partial cross-sectional view of the assembly shown in FIG. 9, with the parts in a different position thereof.

FIG. 11 is a view taken on the line 11—11 of FIG. 9, and looking in the direction of the arrows.

FIG. 12 is an enlarged view of the encircled area designated 12 on FIG. 3.

FIG. 13 is an enlarged view of the encircled area designated 13 on FIG. 3.

FIG. 14 is a cross-sectional view taken on the line 14—14 of FIG. 13.

Figure 1:
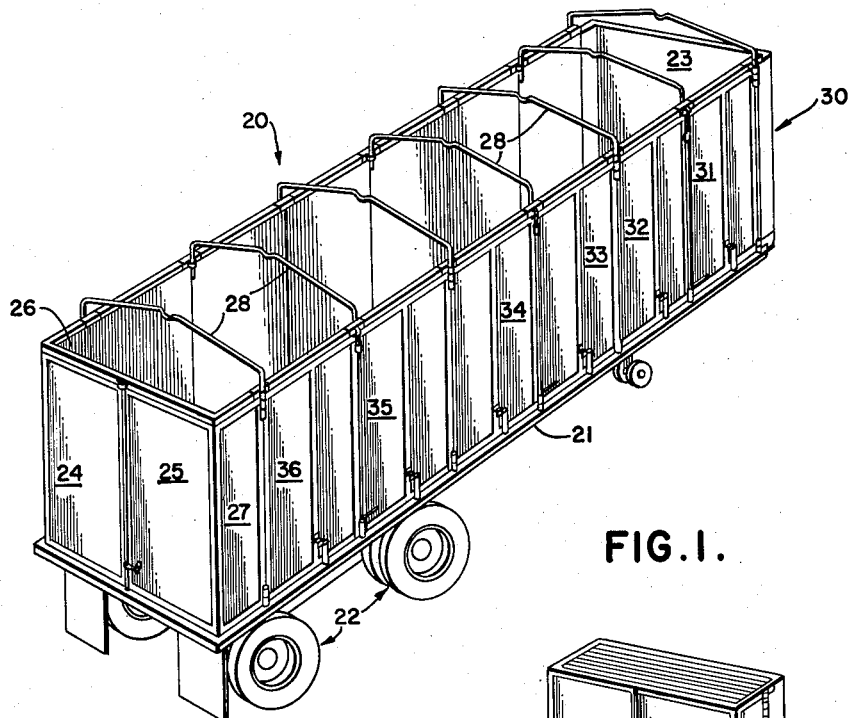
FIG. 1 is a rear perspective view of a trailer in accordance with the present invention, and in the van configuration thereof.

Referring now to the drawings, wherein like or corresponding reference characters are used to designate like or corresponding parts throughout the several views, there is shown in FIG. 1 a trailer generally designated 20, and although a trailer is herein used to illustrate the invention, it is apparent that the invention can also be embodied in other types of load-carrying vehicles. The trailer 20 comprises a frame or base 21 that is supported on a running gear 22 of any suitable type. At the front of the trailer frame or base 21 there is provided an upstanding bulkhead 23, which is preferably permanently installed on the base 21. At the rear end of the trailer 20 there are provided rear doors 24 and 25, which may be of any suitable construction, and which are pivotally secured to removable and non-swinging side panels 26 and 27, respectively. There may also be seen in FIG. 1 tarpaulin bows 28, which extend over the base 21, and from side to side of the trailer 20, as will be hereinafter more fully set forth. The trailer sides themselves are substantially identical, except for some necessary reversal of minor parts, and accordingly only the side 30 will be described in detail.

Side 30 is made up of the door panels 31 through 36, together with the above mentioned panel 27. As will be apparent, the trailer configuration shown in FIG. 1 is that of an open top van, and there will be provided, where appropriate, a tarpaulin over the top of the body 20, and supported on the bows 28, and secured in conventional manner.

Figure 2:
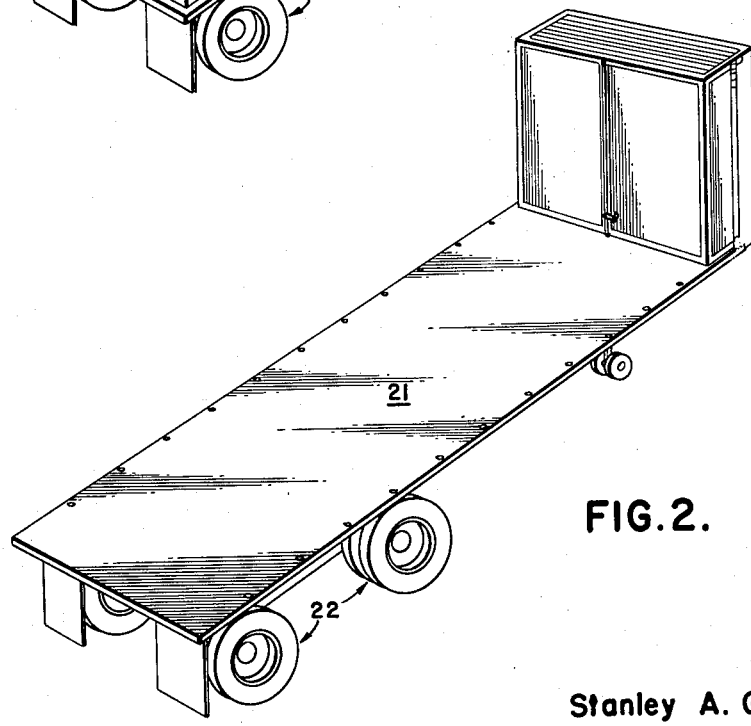
FIG. 2 is a view similar to FIG. 1, but showing the trailer arranged for flatbed usage.

Side 30 of the trailer, and the opposite side thereto, as well as all of the bows 28 and the rear doors 24 and 25 may be completely removed from the base 21 so as to provide the flatbed trailer shown in FIG. 2. These panels and door panels which have been removed may be readily stored at the front end of the trailer, as shown in FIG. 2, so that the trailer in accordance with the present invention may be used as a flatbed trailer to transport goods to a destination, and then for the return or other trip have the side and rear panels available thereon in order to best carry another type of goods or merchandise.

Referring now to FIG. 3, there may be seen the side 30, including the door panels 31 to 36. These door panels constitute, in the embodiment shown, three sets or pairs of door panels, the door panels 31 and 32 constituting the first set or pair and being provided with generally vertically extending hinge axes located at their respective remote edges. A second pair of door panels will be seen to be the panels 33 and 34. Typical door panels 33 will swing open, through a full 180° on the hinge construction shown in the encircled areas designated 5 and 7, which constructions are shown in detail in other figures and will be subsequently described. Door panel 33 is provided with a stake and locking pin assembly which is within the encircled area designated 9, and which will also be detailed and discussed herein below. Finally, the panels 33 and 34 are held in their closed state by the door edge closure stake and locking pin assembly which is shown at the juncture of door panel 33 and 34 and which also is discussed in detail herein below.

It will be understood that the various hinge, locking pin and closure assemblies referred to are typical, and are to be found with each pair of panels, as will be apparent from FIG. 3.

Overlying the door panels 31 and 32 is a first header 41, and similarly a second header 42 overlies the second set or pair of door panels 33 and 34 and the header 43 overlies the third set or pair of door panels 35 and 36. The several headers are each removable, and as is shown in FIG. 4 it is possible with the present construction to swing open a pair of door panels, the panels 35 and 36 being swung part way open, and to remove a tarpaulin bow and the overlying header. In the exemplary configuration shown in FIG. 4, the header 43 has been removed to thereby permit a large and heavy object to be loaded onto the base 21 through the opening provided by the door panels 35 and 36, the object being readily handled by an overhead crane or the like, with depending cable and load engaging means, so that the cable may suspend this heavy object and carry it inboard of the base 21 due to the removal of header 43.

In FIG. 5, there may be seen the details of the hinge and pocket assembly of the encircled area designated 5 on FIG. 3, it being understood that this assembly, generally designated 45, provides for the swinging of either panel 32 or panel 33, shown therein. The base 21 is provided with a socket 46 extending generally vertically therethrough. The door panel 32 has secured to it an angle iron 47 to which is welded a hollow pin 48, the angle iron 47 and pin 48 being adjacent the lower edge of door panel 32. Pin 48 extends downwardly into socket 46. Similarly, to the door panel 33 there is secured, at a position above the angle iron 47, an angle iron 49, and there is supported by angle iron 49, as by welding, a pin 51. Pin 51 has an outer diameter slightly less than the inner diameter of hollow pin 48, and extends thereinto. There is thereby provided a construction which will hold the lower edges of door panels 32 and 33 in secure relationship with the base 21, and which will also permit either of the door panels 32 or 33 to swing about a vertically extending axis through socket 46. As will be understood, door panel 32 may be swung in a clockwise direction as viewed in FIG. 6 through substantially 180°, and similarly door panel 33 may be swung in a counterclockwise direction through a like arc.

In FIG. 7 there is shown the construction of the upper hinge and header assembly 55. On the door panel 33, near the edge thereof and adjacent the upper end thereof there is secured an angle iron 56 which has secured to it the socket 57. Similarly, door panel 32 has an angle iron 58 secured to it and it in turn supports the socket 59. The sockets 57 and 59 are in axial alignment with the socket 46 in base 21 and socket 48 and pin 51. Further, socket 59 will be seen to be below the upper edge of door panel 32, being immediately below socket 57. A header cap 62 is provided above the sockets 57 and 59, the cross-sectional shape of which may be seen in FIG. 8. Header cap 62 has headers 41 and 42 extending thereinto, and secured by suitable releasable means, such as the bolts 63. Secured to and extending downwardly from header cap 62 is a hollow pin 64, pin 64 extending downwardly into the sockets 57 and 59, and thereby serving as a hinge pin. It carries stop collar 61 to properly position the headers. At its upper end, the hollow pin 64 receives the lower end of a tarpaulin bow 28.

As will be understood, the panel 32 may swing on the pin 64, and similarly the panel 33 may swing on this pin, while at the same time there is provided, by virtue of the bolts 63 a construction whereby either or both of the headers 41 and 42 may be readily removed. When assembled as shown in FIGS. 7 and 8, however, there is provided an extremely strong construction having a minimum tendency to weave during hard usage of the trailer 20.

The door panel 31 is generally similar to door panel 33, having similar hardware. The fixed bulkhead 23 is provided with sockets generally like those of door panel 32, so that door panel 31 is swingable about a generally vertically extending hinge line remote from door panel 32.

A stake and locking pin assembly, generally designated 65, is shown in FIGS. 9, 10 and 11, and as will be clear from FIG. 3, each of the door panels is provided with such an assembly. In the base 21 there is provided a socket 66 beneath which is a plate 67. Plate 67 has an oblong hole 68, as may be seen from FIG. 11. Secured to door panel 33, which is typical of all the door panels, is an angle iron 69 which supports a socket 71. Socket 71 has a V-notch 72 at the upper end thereof. A locking pin 73 having a T-head 74 is provided on the lower end of pin 73, and thereby may also be provided on the door panel 32 a pivotally mounted keeper 70.

To secure the door panel 33 in a strong structural relationship with the base 21, the pin 73 is inserted through socket 71 and through socket 66, so that the T-head 74 thereof is in alignment with the slot 68. Thereafter, pin 73 is rotated from the position shown in FIG. 10 to that shown in FIG. 9 thereby providing, due to notch 72, a force which strongly joins, from a structural standpoint, the door panel 33 to the base 21. The keeper 70 may then be pivoted to the position shown in FIG. 9 from that shown in FIG. 10 to thereby prevent accidental movement of pin 73. While the construction provided by the stake and locking pin assembly 65 is structurally strong, it will be seen that the uniting of the assembly 65 may be readily accomplished.

To provide for securely locking the door panels of a pair or set of panels in the closed position, there is provided, as may be seen in FIG. 12, at the bottom of typical panel 33 the assembly 75 which includes a socket 66 and plate 67 in the base 21, and an angle iron 76 carrying a socket 77. The lower end of a closure bar and locking pin 78 may be seen, this generally having the same configuration as the locking pin 73. At its upper end, as is shown in FIG. 13, the closure bar and locking pin 78 is carried in a socket 79 supported by a suitable angle iron 81. The upper end of the closure bar 78 is of generally hook shape, and upon rotation thereof this hook will engage with a pocket 82 (see also FIG. 14) which is part of a cap 83 that is carried on the header 42 and suitably secured thereto. On the rear of the cap 83 is a socket 84 which receives a tarpaulin bow 28.

The assembly 75 thereby provides for the strong structural interconnection of the base 21, the header with which is it joined, such as the header 42, and the door panels with which it is associated such as panels 33 and 34. In addition, this assembly 75 may be readily removed so as to permit the opening of the door panels with which it is associated.

There has been provided a van type, open-top trailer which may be readily side loaded by swinging any of the pairs of door panel to open position, thereby providing in a typical example, a plurality of open spans each of which may be eight or ten feet in width, along the length of the trailer body. These open spans are immediately contiguous with each other, as will be understood. The trailer, or similar body construction herein disclosed, is readily and easily converted from an open-top van to a flatbed trailer, and thereby provides for great flexibility in the types of loads which may be carried from destination to destination. Further, the body construction of the present invention provides the advantages of side loading, heretofore obtained only with closed van bodies, sliding door bodies or commercially uneconomical short bodies. Thus, with the present construction relatively large items may be side loaded onto the base or bed and then transported in the trailer and in a substantially closed van.

The trailer herein provided has side panels which may be easily swung out of the way, through substantially 180° of arc, to permit side loading along substantially the entire body length, while at the same time providing a construction in which the side door panels may be readily disengaged, one at a time, from the trailer bed or base; further, when the door panels are in the closed state, they are all securely interlocked with each other and with the trailer base, to provide an extremely strong side construction which will not weave when the trailer travels, under load, over relatively rough roads.

Since the door panels of the present construction are merely swung away to permit side loading, the trailer herein disclosed will not have the door panels thereof damaged or distorted, which is a common experience with the prior art's removable rack construction.

It will also be appreciated that the trailer of the present invention may have a load placed thereon, at any place along the length of the trailer bed, by fork lift trucks or by an overhead crane, the latter being due to the ready removal of the header. Thus, the entire trailer may be loaded with large and heavy objects by these loading equipments.

The trailer of the present invention also offers the advantage that for loading of relatively conventional articles, as by a fork lift truck, it is only necessary to roll back the tarpaulin from the tarpaulin bows, and the tarpaulin bows may remain in place and do not need to be removed, this resulting from the fact that the door panels may be swung to the open position with the headers and bows in place.

It will be obvious to those skilled in the art that various changes may be made without departing from the spirit of the invention and therefore the invention is not limited to what is shown in the drawings and described in the specification but only as indicated in the appended claims.

What is claimed is:

1. In a vehicle body construction, generally horizontal base means, sides on said base means, at least four aligned and contiguous door panels constituting at least part of the linear extent of one of said sides and substantially the full height thereof, means for separably hingedly connecting the two intermediate door panels adjacent the lower part of their mutually adjacent edges to each other and to said base means, means for separably hingedly connecting the two intermediate door panels adjacent the upper part of their mutually adjacent edges, the two end door panels having separable upper and lower hinge means at the edges thereof remote from said intermediate door panels for effecting swinging movement thereof, releasable means for structurally interconnecting all of said upper hinge means, releasable means at the free edges of said door panels engageable with said last mentioned means, said base means and said door panels for securing said door panels to said last mentioned means and said base means, and means for releasably securing each said door panel to said base means at an intermediate point of each said panel.

2. In a vehicle body construction, generally horizontal base means, sides on said base means, at least four aligned and contiguous door panels constituting at least part of the linear extent of one of said sides and substantially the full height thereof, means for separably hingedly connecting the two intermediate door panels adjacent the lower part of their mutually adjacent edges to each other and to said base means, means for separably hingedly connecting the two intermediate door panels adjacent the upper part of their mutually adjacent edges, the two end door panels having separable upper and lower hinge means at the edges thereof remote from said intermediate door panels for effecting swinging movement thereof, releasable means for structurally interconnecting all of said upper hinge means, and releasable means at the free edges of said door panels engageable with said last mentioned means, said base means and said door panels for securing said door panels to said last mentioned means and said base mean.

3. In a vehicle body construction, generally horizontal base means, said base means comprising a socket, sides on said base means, at least four aligned and contiguous door panels constituting at least part of the linear extent of one of said sides and substantially the full height thereof, the two intermediate door panels having hinge means at their mutually adjacent vertical edges for effecting swinging movement of said door panels, said hinge means comprising a hollow pin adjacent the lower edge of one of said intermediate door panels and secured thereto, said hollow pin extending into said socket, said other intermediate door panel having a pin thereon extending downwardly into said first mentioned hollow pin, said one intermediate door panel having a socket adjacent to but below the upper edge thereof and in alignment with said socket in said base means, the second intermediate door panel having a socket adjacent its upper edge in alignment with said above mentioned sockets, a header extending longitudinally above said base means and approximately over an edge thereof, said header having a pin extending into said upper edge sockets of said intermediate door panels, the two end door panels having separable hinge means at the edges thereof remote from said intermediate door panels for effecting swinging movement thereof, and means for releasably securing each end door panel and the adjacent intermediate door panel in closed, aligned relationship, whereby said door panels constitute substantially the full height of said side and an end and intermediate panel may be swung open to provide for side loading of said body.

4. In a vehicle body construction, generally horizontal base means, said base means comprising a socket, sides on said base means, at least four aligned and contiguous door panels constituting at least part of the linear extent of one of said sides and substantially the full height thereof, the two intermediate door panels having hinge means at their mutually adjacent vertical edges for effecting swinging movement of said door panels, said hinge means comprising a hollow pin adjacent the lower edge of one of said intermediate door panels and secured thereto, said hollow pin extending into said socket, said other intermediate door panel having a pin thereon extending downwardly into said first mentioned hollow pin, said first mentioned intermediate door panel having a socket adjacent to but below the upper edge thereof and in alignment with said socket in said base means, the second intermediate door panel having a socket in alignment with said above mentioned sockets, a pin extending into said sockets of said intermediate door panels, the two end door panels having hinge means at the edges thereof remote from said intermediate door panels for effecting swinging movement thereof, whereby said door panels constitute substantially the full height of said side and an end and intermediate panel may be swung open to provide for side loading of said body.

5. In a vehicle body construction, generally horizontal base means, said base means comprising a socket, sides on said base means, at least four aligned and contiguous door panels constituting at least part of the linear extent of one of said sides and substantially the full height thereof, the two intermediate door panels having hinge means at their mutually adjacent vertical edges for effecting swinging movement of said door panels, said hinge means comprising a hollow pin adjacent the lower edge of one of said intermediate door panels and secured thereto, said hollow pin extending into said socket, said other intermediate door panel having a pin thereon extending downwardly into said first mentioned hollow pin, the two end door panels having hinge means at the edges thereof remote from said intermediate door panels for effecting swinging movement thereof, whereby said door panels constitute substantially the full height of said side and an end and intermediate panel may be swung open to provide for side loading of said body.

6. In a vehicle body construction, generally horizontal base means, sides on said base means, at least four aligned and contiguous door panels constituting at least part of the linear extent of one of said sides and substantially the full height thereof, the two intermediate door panels having hinge means at their mutually adjacent vertical edges for effecting swinging movement of said door panels, header means extending longitudinally above said base means and approximately over an edge thereof, said header means having a pin extending therefrom, said pin comprising a hinge pin for at least part of said hinge means, the two end door panels having hinge means at the edges thereof remote from said intermediate door panels for effecting swinging movement thereof, whereby said door panels constitute substantially the full height of said side and an end and intermediate panel may be swung open to provide for side loading of said body.

7. The construction of claim 6, said pin being hollow and an end of a tarpaulin bow being inserted therein.

8. In a vehicle body construction, generally horizontal base means, sides on said base means, at least four aligned and contiguous door panels constituting at least part of the linear extent of one of said sides and substantially the full height thereof, the two intermediate door panels having hinge means at their mutually adjacent vertical edges for effecting swinging movement of said door panels, header means extending longitudinally above said base means and approximately over an edge thereof, said header means having a pin extending therefrom, said pin comprising a hinge pin for at least part of said hinge means, said header means comprising a first header extending over an end door panel and the adjacent intermediate door panel and a second header extending over the other two door panels, means for releasably connecting said two headers in aligned relation, the two end door panels having hinge means at the edges thereof remote from said intermediate door panels for effecting swinging movement thereof, whereby said door panels constitute substantially the full height of said side and an end and intermediate panel may be swung open to provide for side loading of said body.

9. In a vehicle body construction, generally horizontal base means, sides on said base means, at least four aligned and contiguous door panels constituting at least part of the linear extent of one of said sides and substantially the full height thereof, the two intermediate door panels having hinge means at their mutually adjacent vertical edges for effecting swinging movement of said door panels, header means extending longitudinally above said base means and approximately over an edge thereof, said header means having a pin extending therefrom, said pin comprising a hinge pin for at least part of said hinge means, said header means comprising a first header extending over an end door panel and the adjacent intermediate door panel and a second header extending over the other two door panels, means for releasably connecting said two headers in aligned relation comprising a cap receiving an end of each header therein, said pin extending from said cap, releasable securing means for said cap and headers, the two end door panels having hinge means at the edges thereof remote from said intermediate door panels for effecting swinging movement thereof, whereby said door panels constitute substantially the full height of said side and an end and intermediate panel may be swung open to provide for side loading of said body.

10. In a vehicle body construction, generally horizontal base means, sides on said base means, at least four aligned and contiguous door panels constituting at least part of the linear extent of one of said sides and substantially the full height thereof, the two intermediate door panels having hinge means at their mutually adjacent vertical edges for effecting swinging movement of said door panels, the two end door panels having hinge means at the edges thereof remote from said intermediate door panels for effecting swinging movement thereof, header means extending longitudinally above said base means and approximately over an edge thereof, and means for connecting said header to each said door panel at two spaced points, whereby each said door panel is structurally interconnected with said header.

11. The construction of claim 10, and means for releasably securing each said door panel to said base means.

12. In a vehicle body construction, generally horizontal base means, sides on said base means, at least four aligned and contiguous door panels constituting at least part of the linear extent of one of said sides and substantially the full height thereof, the two intermediate door panels having hinge means at their mutually adjacent vertical edges for effecting swinging movement of said door panels, the two end door panels having hinge means at the edges thereof remote from said intermediate door panels for effecting swinging movement thereof, means for releasably securing each end door panel and the adjacent intermediate door panel in closed, aligned relationship, stake and locking pin assembly means for each said door panel intermediate the vertical edges thereof comprising a socket in said base means, a plate underlying said socket and having an oblong slot therein, a socket secured to each said door panel above the socket in said base means, a pin extending through said sockets and having a lateral extension on the lower end thereof for passing through said slot, and cam means for urging said door panel downwardly towards said base means operable upon rotation of said pin in said sockets, whereby said door panels constitute substantially the full height of said side and an end and intermediate panel may be swung open to provide for side loading of said body and each said door panel may be secured at an intermediate point to said base means.

13. In a vehicle body construction, a generally horizontal base means, sides on said base means, at least four aligned and contiguous door panels constituting at least part of the linear extent of one of said sides and substantially the full height thereof, the two intermediate door panels having hinge means at their mutually adjacent vertical edges for effecting swinging movement of said door panels, the two end door panels having hinge means at the edges thereof remote from said intermediate door panels for effecting swinging movement thereof, means for releasably securing each end door panel and the adjacent intermediate door panel in closed, aligned relationship, stake and locking pin assembly means for each said door panel intermediate the vertical edges thereof comprising aligned sockets carried by the door panel and said base means, a pin extending through said sockets, and means for causing said pin to urge said door panel towards said base means upon rotation thereof, whereby said door panels constitute substantially the full height of said side and an end and intermediate panel may be swung open to provide for side loading of said body and each said door panel may be secured at an intermediate point to said base means.

14. In a vehicle body construction, generally horizontal base means, sides on said base means, at least four aligned and contiguous door panels constituting at least part of the linear extent of one of said sides, the two intermediate door panels having hinge means at their mutually adjacent vertical edges for effecting swinging movement of said door panels, header means extending longitudinally above said base means and approximately over an edge thereof, the two end door panels having hinge means at the edges thereof remote from said intermediate door panels for effecting swinging movement thereof, and means for releasably securing an end door panel and the adjacent intermediate door panel in closed aligned relationship comprising a pin having means at its upper end for selectively engaging said header means and means at its lower end for selectively engaging said base means, said pin being carried in socket means secured to one said door panel.

15. In a vehicle body construction, base means comprising a socket, a hollow pin secured to a door panel, said hollow pin extending into said socket, a second pin extending downwardly into said first mentioned hollow pin and secured to a second panel, whereby said pins may be readily successively disengaged.

16. In a vehicle body construction, base means comprising a socket, a hollow pin secured to a door panel, said hollow pin extending into said socket and having an outer diameter slightly less than the inner diameter of said socket, a second pin extending downwardly into said first mentioned hollow pin and secured to a second panel, said second pin having an outer diameter slightly less than the inner diameter of said hollow pin, whereby said pins may be readily successively disengaged.

References Cited in the file of this patent

UNITED STATES PATENTS

| | | |
|---|---|---|
| 860,769 | Tait | July 23, 1907 |
| 900,794 | Stoffels | Oct. 13, 1908 |
| 1,341,744 | Hatch | June 1, 1920 |
| 1,368,907 | Dymock | Feb. 15, 1921 |
| 1,425,596 | Kramer | Aug. 15, 1922 |
| 1,479,413 | Hedman | Jan. 1, 1924 |
| 1,893,532 | Ball | Jan. 10, 1933 |
| 2,080,764 | Crawford | May 18, 1937 |
| 2,679,432 | Ruth | May 25, 1954 |
| 2,741,507 | Ambli | Apr. 10, 1956 |
| 2,887,735 | Coffey | May 26, 1959 |

FOREIGN PATENTS

| | | |
|---|---|---|
| 694,986 | France | Sept. 23, 1930 |